US012194979B2

United States Patent
Knosmann et al.

(10) Patent No.: US 12,194,979 B2
(45) Date of Patent: Jan. 14, 2025

(54) REDUNDANT PLC SIGNALS EVALUATION

(71) Applicant: ZF CV Systems Global GmbH, Bern (CH)

(72) Inventors: Michael Knosmann, Hannover (DE); Arne Michaelsen, Seelze (DE); Robert Otremba, Ronnenberg (DE); Detlef Schmidt, Gehrden (DE); Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 483 days.

(21) Appl. No.: 17/727,443

(22) Filed: Apr. 22, 2022

(65) Prior Publication Data

US 2022/0340115 A1 Oct. 27, 2022

(30) Foreign Application Priority Data

Apr. 22, 2021 (DE) ...................... 10 2021 110 316.9

(51) Int. Cl.
*B60T 8/88* (2006.01)
*B60T 8/94* (2006.01)
*B60T 13/68* (2006.01)

(52) U.S. Cl.
CPC ................ *B60T 8/885* (2013.01); *B60T 8/94* (2013.01); *B60T 13/683* (2013.01);
(Continued)

(58) Field of Classification Search
CPC .......... B60T 8/885; B60T 8/94; B60T 13/683; B60T 2270/10; B60T 2270/402; B60T 2270/413
(Continued)

(56) References Cited

U.S. PATENT DOCUMENTS 6,512,452 B1 1/2003 Brannan et al.
11,370,404 B2 * 6/2022 Michaelsen ........... B60T 13/683
(Continued)

FOREIGN PATENT DOCUMENTS

DE 20 2005 020 802 U1 3/2007
DE 10 2007 020 881 A1 7/2008
(Continued)

OTHER PUBLICATIONS

ISO 11992-1, "Road vehicles—Interchange of digital information on electrical connections between towing and towed vehicles—Part 1: Physical and data-link layers", Reference No. ISO 11992-1:2019(E), Third Edition, May 2019, pp. 1 to 22 (32 pages), copyright ISO.
(Continued)

*Primary Examiner* — Christopher P Schwartz
(74) *Attorney, Agent, or Firm* — Walter Ottesen, P.A.

(57) ABSTRACT

The disclosure relates to a method for controlling an electronically controllable pneumatic braking system for a towing vehicle. The towing vehicle has front axle brake actuators and rear axle brake actuators; a primary system with a primary control unit for controlling the front and rear axle brake actuators; a secondary system with a secondary control unit for controlling the front and rear axle brake actuators in the event that a fault is detected in the primary system and the braking system is controlled by the secondary system; a trailer control valve for providing a trailer brake pressure at a trailer brake pressure port; and a PLC connector for receiving PLC signals from a trailer. The method includes: providing PLC signals received at the PLC connection both in the primary system and in the secondary system; and processing PLC signals in both the primary system and the secondary system.

21 Claims, 2 Drawing Sheets

(52) U.S. Cl.
CPC ..... *B60T 2270/10* (2013.01); *B60T 2270/402* (2013.01); *B60T 2270/413* (2013.01)

(58) Field of Classification Search
USPC .............................. 303/3, 15, 20, 113.1, 127
See application file for complete search history.

(56) References Cited

U.S. PATENT DOCUMENTS

| | | | |
|---|---|---|---|
| 11,511,711 B2* | 11/2022 | Van Thiel | B60T 13/38 |
| 11,595,228 B2* | 2/2023 | Dieckmann | H04L 12/66 |
| 11,807,208 B2* | 11/2023 | Van Thiel | B60T 15/027 |
| 11,926,302 B2* | 3/2024 | Michaelsen | B60T 8/343 |
| 2010/0019565 A1 | 1/2010 | Broch et al. | |
| 2019/0248346 A1* | 8/2019 | Wulf | B60T 7/20 |
| 2019/0299946 A1* | 10/2019 | Miller, Jr. | B60T 8/38 |

FOREIGN PATENT DOCUMENTS

| | | | |
|---|---|---|---|
| WO | 2018/041387 A1 | 3/2018 | |
| WO | WO-2021073931 A1 * | 4/2021 | ............ B60T 13/263 |

OTHER PUBLICATIONS

J2497Jul. 2012, "Surface Vehicle Recommended Practice, Power Line Carrier Communications for Commercial Vehicles", SAE International, Issued Oct. 2002, pp. 1 to 22, copyright 2012 SAE International.

* cited by examiner

REDUNDANT PLC SIGNALS EVALUATION

CROSS REFERENCE TO RELATED APPLICATION

This application claims priority of German patent application no. 10 2021 110 316.9, filed Apr. 22, 2021, the entire content of which is incorporated herein by reference.

TECHNICAL FIELD

The disclosure relates to a method for controlling an electronically controllable pneumatic braking system for a towing vehicle of a vehicle combination, in particular a commercial vehicle combination. The electronically controllable pneumatic braking system includes at least first and second front axle brake actuators on a front axle of the towing vehicle and at least first and second rear axle brake actuators on a rear axle of the towing vehicle, as well as a primary system with a primary control unit at least for controlling the first and second front axle brake actuators and the first and second rear axle brake actuators and a secondary system with a secondary control unit at least for controlling the first and second front axle brake actuators and the first and second rear axle brake actuators in the event that a fault is detected in the primary system and the electronically controllable pneumatic braking system is at least partially controlled by the secondary system. In addition, a trailer control valve controllable by the primary control unit is provided for providing a trailer brake pressure at a trailer brake pressure port of the trailer control valve. The electronically controllable pneumatic braking system also includes a PLC connection for receiving PLC signals from a trailer of the vehicle combination. PLC stands for power line communication, preferably according to SAE-J2497 (the entirety of which is incorporated by reference herein), for the combined transmission of data and energy.

BACKGROUND

In vehicle combinations, in particular commercial vehicle combinations, which include a towing vehicle and a trailer, in which there are an electronically controllable pneumatic towing vehicle braking system in the towing vehicle and an electronically controllable trailer braking system (TEBS) in the trailer, braking requirements can be implemented both in the towing vehicle and in the trailer depending on a driver's demand specified by a foot brake valve or depending on an automatically specified target vehicle acceleration or target vehicle speed.

For this purpose, axle modulators of the towing vehicle are electronically controlled by a central control unit depending on the driver's demand or the automated demand, which then pneumatically control a towing vehicle brake pressure at the towing vehicle service brakes in the towing vehicle braking system. At the same time, the trailer braking system is electrically controlled by the central control unit via a trailer plug connection, so that the trailer is braked simultaneously with the towing vehicle depending on the driver's demand or the automated demand. This is done, for example, according to ISO11992, the entirety of which is incorporated by reference herein.

In addition to this purely electronic control of the trailer, a trailer can also be partially or completely pneumatically controlled.

For a regular, pressure-controlled operation of the trailer, the trailer control valve is provided, which provides at least the trailer brake pressure as a control pressure for control of a trailer brake pressure at brake actuators of the trailer. In addition to the trailer brake pressure, a trailer supply pressure is also transferred, which can also be done through the trailer control valve, or through a separate valve, such as in particular a so-called trailer protection valve.

There is a problem in particular whenever a fault in the primary system is detected and the secondary system has to take over. Such configurations are generally known. A fault in the primary system is, for example, a fault that partially or completely prevents the control of the front axle brake pressure and/or the rear axle brake pressure, for example because a control unit in the primary system has failed, such as in particular the primary control unit, or the like. In this case, it is known that the secondary system takes over the control of the braking system and thus also the control of the front axle and rear axle brake pressures, which are then preferably redundantly controlled front axle and rear axle brake pressures. Secondary systems, as well as secondary control units, are usually equipped with a smaller range of functions and include only necessary and safety-relevant functions, for example.

There is also a problem in particular when a trailer is coupled to the towing vehicle. Trailers also typically have an ABS system, which is important for the stability of the trailer. If an ABS function in the trailer cannot be implemented or cannot be implemented correctly, instabilities in the trailer may occur, which in turn can affect the towing vehicle and lead to overall instability. Therefore, in the event that an ABS system in the trailer is not available, for example because the ABS system in the trailer has failed, or because the secondary system does not support an ABS system in the trailer, it is nevertheless possible to achieve the greatest possible stabilization of the trailer in order to be able to stabilize the trailer as far as possible in order to improve overall performance. This does not only relate to the secondary system. Rather, it should also be possible to stabilize the trailer in the event of control of the electronically controllable pneumatic braking system by the primary system and in the event of failure or partial failure of the ABS system in the trailer.

In US 2010/0019565 and U.S. Pat. No. 6,512,452 B1 the transmission is described of trailer control signals for controlling the trailer brake circuit via a trailer plug connection that has a CAN interface or a PLC interface (Power-Line Communication) from the central control unit to the trailer in order to be able to cause electrically controlled braking of the trailer by the towing vehicle.

Furthermore, a method for the electronic control of a braking system is known from US 2019/0248346, which uses two braking systems and is provided in an automatically controllable vehicle combination. The method includes the steps: reading a requirement signal for the automated electronic control of service brakes in a towing vehicle braking system of a towing vehicle and/or a trailer braking system of a trailer of the vehicle combination, wherein an automatically requested target vehicle acceleration and/or an automatically requested target vehicle speed controlled by the respective service brakes will be transmitted via the request signal; monitoring and plausibility checking the request signal to determine whether the automatically requested target vehicle acceleration and/or the automatically requested target vehicle speed are or can be controlled completely or error-free by the respective service brakes; outputting a trailer redundancy control signal to the trailer braking system if the automatically requested target vehicle acceleration and/or the automatically requested target vehicle speed is not implemented or cannot be implemented fully or error-free. The idea described in US 2019/0248346 lies in particular in providing a trailer with a certain signal in the event of a fault in order to brake the vehicle combination by means of the trailer to a safe state. Redundant braking in the trailer itself or redundant braking in the towing vehicle itself is not primarily the focus here, but in particular the redundant braking of the towing vehicle by means of the trailer. Furthermore, US 2019/0248346 does not deal with the availability of ABS systems in a trailer.

SUMMARY

It is an object of the present disclosure to provide a method and a braking system by means of which the safety in a vehicle combination, in particular the stability of the vehicle combination, can be increased and the performance of the vehicle combination can be enhanced.

The object can, for example, be achieved via a method including the steps: providing PLC signals received at the PLC connection both in the primary system and in the secondary system; and processing of PLC signals in both the primary system and the secondary system.

PLC (Power-Line Communication) signals are signals that are superimposed on an electrical supply signal between the towing vehicle and the trailer. The towing vehicle supplies the trailer with electrical energy via a PLC line and signals that can be exchanged between the trailer and the towing vehicle are superimposed on the same line. According to the disclosure, these signals are provided not only to the primary system, but also to the secondary system. According to the disclosure, the PLC signals are evaluated and processed not only in the primary system, but also in the secondary system and are thus available in the secondary system. In this way, even during the operation of the braking system, the secondary system can ensure that the information provided by means of the PLC signal is available in the secondary system and can be used by it. Of primary interest is the information about whether an ABS system in the trailer is available and ready for operation or not. This can be determined, for example, based on an ABS trailer flag in the PLC signal. The method according to the disclosure thus makes it possible, including in the event that the secondary system takes over the control of the braking system partially or completely, depending on the availability of an ABS system in the trailer, for example, to control this accordingly in order to increase the stability of the vehicle combination in this way.

Exact details of the electronically controllable pneumatic braking system are explained below in detail with reference to the second aspect of the disclosure concerning the electronically controllable pneumatic braking system and in the embodiments. It is to be understood that the method according to the first aspect of the disclosure can be implemented in and can be carried out by an electronically controllable pneumatic braking system according to the second aspect of the disclosure, so that the embodiments and advantages described below apply equally to both aspects of the disclosure.

It is advantageously provided that the step of processing the PLC signals in both the primary system and in the secondary system includes: processing the PLC signals in the primary control unit and processing the PLC signals in the secondary control unit. In the electronically controllable pneumatic braking system, the primary control unit can preferably be used to control the primary system, that is to implement in particular brake requirement signals, which are provided, for example, by a unit for autonomous driving or another higher level unit, such as in particular an electronic active steering device, in order to control the front axle and rear axle brake actuators based on this. The secondary control unit is used to control the secondary system accordingly. The primary and secondary systems can access the same elements such as, in particular, the brake actuators on the front and rear axles, which can be controlled by both the primary and secondary systems. It can also be preferred that, for example, wheel revolution rate sensors, which are provided on the wheels of the front and/or rear axle, are used by both the primary and secondary systems and are connected, for example, to the primary control unit and the secondary control unit via Y-cabling. In this way, both the primary control unit and the secondary control unit can access the wheel revolution rate signals of the corresponding sensors. Both the primary and secondary control units can preferably be connected to the vehicle bus but can be supplied from various voltage sources. It can also be preferred that both the primary and the secondary control unit are connected to any brake encoder, preferably a foot brake pedal, which may have, for example, two electrical connections and one pneumatic connection. Thus, it can be preferred that, for example, a first electrical channel of the foot brake pedal is connected to the primary control unit and a second electrical channel of the foot brake pedal is connected to the secondary control unit. The primary and secondary control units can preferably be connected to each other via a data bus to exchange data, monitor each other or perform other functions.

By processing the PLC signals provided at the PLC connection in both the primary control unit and the secondary control unit, they are available independently of each other in both control units. For this purpose, the primary control unit and the secondary control unit preferably can have their own PLC chip, which can read and process the PLC signals. The PLC chip can preferably be integrated into the primary control unit and the secondary control unit and in particular is provided on the board thereof.

The method can include the step: matching the PLC signals received in the primary system and the secondary system. This step can preferably be carried out when the primary system and preferably also the secondary system are in a fault-free state. A fault-free state is characterized in particular by the fact that a brake requirement can be fully and correctly implemented both in the primary system and preferably in the secondary system. In the opposite case, an error can occur especially if a brake requirement cannot be implemented or cannot be implemented correctly. This can be the case if, for example, the primary control unit has failed, in particular is deenergized. In this case, a timeout signal can preferably be sent by the secondary control unit, which states that the primary control unit is no longer responding. It may also be provided that the primary control unit itself outputs an error signal in the event of a fault.

Based on the comparison of the PLC signals in the primary system and the secondary system, a plausibility check of the PLC signals can be carried out and the data integrity can be increased in this way. Should a deviation arise here, this may also indicate a fault in one of the two primary or secondary control units and measures can be taken if necessary. The comparison of the PLC signals can be carried out both in the primary control unit and in the secondary control unit. It may also be provided that the comparison is carried out in a separately designated control unit. Also, both the primary control unit and the secondary control unit can perform a comparison and only the results of the comparisons are compared with each other.

A method further can include the step: providing the trailer brake pressure at the trailer brake pressure port by the primary system and/or the secondary system depending on the received PLC signals. The trailer can be partially or completely pneumatically controlled, namely by providing a trailer brake pressure through the trailer control valve. The trailer brake pressure is usually a control pressure that is volume-boosted in the trailer itself and then provided to the multiple brake actuators on the trailer. The provided trailer brake pressure can be varied depending on the received PLC signal. For example, it is conceivable and preferred that in the event that the PLC signal indicates that an ABS system is available in the trailer, the trailer control pressure is provided in the usual manner, and any necessary pulsation is implemented in the trailer itself by ABS valves present there. However, if the processing of the PLC signal shows that the ABS system in the trailer is not available, it can preferably be provided that the pulsed trailer brake pressure is provided at the trailer brake pressure port. The pulsation of the trailer brake pressure can be carried out based on wheel revolution rate signals of the towing vehicle and/or a predefined scheme, for example depending on a trailer load, speed, trajectory, et cetera.

Preferably, therefore, in the event that an ABS function is not available in the trailer, a reliable modulation of the trailer brake pressure can be carried out in the primary system and/or the secondary system and a reliably modulated trailer brake pressure is provided at the trailer brake pressure port. The reliable modulation of the trailer brake pressure can be carried out in the trailer control valve itself by a separate upstream or downstream ABS valve, or by providing an already reliably modulated pressure to the trailer control valve, which has been derived from an ABS-modulated pressure on another axle, such as in particular the front or rear axle of the towing vehicle. In this case, the reliably modulated trailer brake pressure can preferably be controlled open-loop, wherein actual control is preferably not carried out. If an ABS system is not available in the trailer, the towing vehicle usually does not receive wheel revolution rate signals, so that full slip control is not possible. However, the effective brake pressure can be reduced slightly to avoid overbraking the trailer. The pulsed control of the trailer brake pressure has proven to be effective in order to be able to build up cornering forces at least temporarily in a very light trailer that would otherwise be overbraked, thus ensuring the stability of the trailer.

In an embodiment, it is provided that the step of processing the PLC signals in both the primary system and in the secondary system includes: receiving vehicle data at the primary system and the secondary system via a vehicle bus; and combining the received PLC signals with the received vehicle data. Such vehicle data may include, in particular, information about the number of coupled trailers, vehicle weight, vehicle model and the like. The combination of the received PLC signals with the received vehicle data can be carried out both in the primary control unit and in the secondary control unit or in both. However, a separate perception unit in which this combination is carried out may also be preferred. This can be connected to both the primary control unit and the secondary control unit and can receive data from them and provide data to them. The connection can preferably be made via a separate data bus line and/or the vehicle bus.

According to a further embodiment, it is provided that in the event that the primary system is in a fault-free state, the trailer brake pressure is provided by its primary system at the trailer brake pressure port; and in the event that a fault is detected in the primary system, the trailer brake pressure is provided at the trailer brake pressure port as a trailer redundancy brake pressure by the secondary system. In normal operation, when the primary system is functioning fault-free, it provides the trailer brake pressure. This can preferably be done by the primary system providing brake pressure signals or switching signals at the trailer control valve that cause one or more electromagnetic valves of the trailer control valve to be switched so that the trailer brake pressure is controlled. The trailer control valve can be equipped with its own electronic control unit (ECU) for this purpose or may only have an electrical connection, so that the electrical switching signals are provided by a higher-level control unit, such as the primary control unit, to switch the electromagnetic valves of the trailer control valve. For this purpose, only power amplifiers can be integrated in the trailer control valve. In the same way, it may also be provided that the secondary system, in the event that a fault is detected in a primary system, causes control of the trailer brake pressure, or in this case the trailer redundancy brake pressure. However, it may also be provided that the trailer redundancy brake pressure is redundantly controlled purely pneumatically by a unit of the secondary system, such as the secondary control unit, providing a corresponding trailer redundancy control pressure at the trailer control valve, so that the trailer redundancy brake pressure is then controlled pneumatically. This can be caused, for example, by the fact that the trailer redundancy control pressure acts on a control surface of a relay valve of the trailer control valve, which then boosts the volume of the trailer redundancy control pressure and controls it as a trailer redundancy brake pressure at the trailer brake pressure port. However, the trailer redundancy control pressure can also be a pressure of another axle, a pressure derived therefrom or a modulated pressure. Furthermore, it can preferably be provided that the trailer brake pressure provided by the primary system is partially or completely independent of a front axle brake pressure and/or a rear axle brake pressure, and the trailer redundancy brake pressure provided by the secondary system is the front axle or rear axle brake pressure or a pressure derived therefrom. While the primary system therefore preferably controls the trailer control valve independently of the front axle and the rear axle, but depending on a brake requirement signal, that is, a trailer brake pressure specifically intended for the trailer is controlled at the trailer brake pressure port, the trailer is braked in secondary system mode depending on the towing vehicle. The trailer redundancy control pressure described above can in this case be, for example, the front axle brake pressure, which is controlled at the front axle by the redundancy control unit. It can also be a pressure derived therefrom. It may also be provided that the trailer redundancy control pressure is a pneumatic pressure controlled by a foot brake valve or a pressure derived therefrom. This is particularly preferred if the foot brake valve also has one or more pneumatic ports.

In the event that it is determined on the basis of the PLC signals that no ABS system is available in the trailer, it may also be provided that the trailer redundancy control pressure is already reliably provided modulated or pulsed or ABS-modulated. This can be caused by the fact that there is an ABS valve upstream of the trailer control valve, more precisely the port for receiving the trailer redundancy control pressure. However, it can also be caused by the fact that the trailer redundancy control pressure is taken from downstream of an ABS valve of another axle, such as a front axle, and is accordingly provided to the trailer control valve. In this case, the trailer is then controlled depending on the ABS function of the front axle.

In a second aspect, the disclosure achieves the object mentioned at the beginning by an electronically controllable pneumatic braking system for a towing vehicle of a vehicle combination of the type mentioned above. In an electronically controllable pneumatic braking system according to the second aspect of the disclosure, it is provided that this includes at least first and second front axle brake actuators on a front axle of the towing vehicle and at least first and second rear axle brake actuators on a rear axle of the towing vehicle, as well as a primary system with a primary control unit at least for controlling the first and second front axle brake actuators and the first and second rear axle brake actuators, as well as a secondary system with a secondary control unit at least for controlling the first and second front axle brake actuators and the first and second rear axle brake actuators in the event that a fault is determined in the primary system and the control of the electronically controllable pneumatic braking system is at least partially carried out by the secondary system. Furthermore, a trailer control valve controllable by the primary control unit is provided for providing a trailer brake pressure at a trailer brake pressure port. The electronically controllable pneumatic braking system also includes a PLC connection for receiving PLC signals from a trailer of the vehicle combination. It is provided according to the disclosure that both the primary system and the secondary system are configured to receive and process PLC signals provided at the PLC connection.

It is to be understood that the method according to the first aspect of the disclosure and the electronically controllable pneumatic braking system according to the second aspect of the disclosure have the same and similar sub-aspects as they are laid down below. In this respect, for the second aspect of the disclosure, its development, advantages and alternatives, full reference is made to the above description of the first aspect of the disclosure.

In a first embodiment of the electronically controllable pneumatic braking system, the primary control unit and the secondary control unit are directly or indirectly connected to the PLC connection to receive PLC signals from it. For example, the primary control unit and the secondary control unit are connected to the PLC connection by Y-cabling. Y-cabling is a direct cabling of the primary and secondary control unit to the PLC connection. However, it may also be provided that the primary and secondary control units are only indirectly connected to the PLC connection. For example, the PLC signal could be looped through the secondary control unit to the primary control unit or vice versa. For example, it is also conceivable that the PLC signals are first evaluated in a separate evaluation unit and converted into data bus-capable signals, which are then provided on the vehicle bus. However, direct cabling is more robust and leads to an immediate provision of PLC signals, regardless of other equipment, processing, and the like.

In an embodiment, the primary control unit has a primary PLC chip for processing the PLC signals and the secondary control unit has a secondary PLC chip for processing the PLC signals. Since PLC signals are superimposed on a line intended for power transmission, it is necessary that the primary and secondary control units are set up to isolate the PLC signals when they are wired directly to the PLC connector. For this purpose, they preferably have the PLC chip to be able to perform the isolation of the signals automatically and independently of each other. The primary PLC chip and the secondary PLC chip may be provided in separate units within the respective primary and secondary control units or integrated on the board of the primary and secondary control units.

In an embodiment of the electronically controllable pneumatic braking system, it is provided that the primary control unit and the secondary control unit are connected to each other via a data bus for the exchange of information about processing of the PLC signals. The data bus between the primary control unit and the secondary control unit preferably connects them directly and not via the vehicle bus. This means that a direct data connection is created between the primary and secondary control units. On this data bus, the primary and secondary control units can exchange data and signals and, in particular, can carry out mutual monitoring. If, for example, the secondary control unit detects a timeout of the primary control unit because it has a fault, for example, the secondary control unit can take over the control of the braking system. Via this direct data bus connection, the primary and secondary control units preferably also exchange information about the PLC signals they have received and processed. In this way, a plausibility check of the processing of the PLC signals and the PLC signals themselves can be carried out in the primary and secondary control units, thereby increasing data integrity.

It can be preferred that the electronically controllable pneumatic braking system has: a rear axle modulator connected to at least a first or second compressed air supply, which is configured to control at least a rear axle brake pressure on the first and second rear axle brake actuators depending on the rear axle brake signals provided by the primary control unit; and a front axle modulator connected to at least the first or second compressed air supply, which is configured to control at least a front axle brake pressure on the first and second front axle brake actuators depending on the front axle brake signals provided by the primary control unit and/or a pneumatic front axle control pressure. Both the rear axle modulator and the front axle modulator can be configured as a single-channel or two-channel modulator and can trigger wheel-appropriate or axle-appropriate braking. In one variant, the rear axle modulator is integrated with the primary control unit. The front axle modulator can have its own electronic control unit or can be configured without such intelligence.

Both the front axle modulator and the rear axle modulator preferably have one or more electromagnetically switchable valves to modulate the correspondingly provided front axle or rear axle brake pressure from the supply pressure provided to them of the first or second compressed air reservoirs. In one variant, the front axle modulator is connected to the second compressed air supply and the rear axle modulator is connected to the first compressed air supply, thus creating a front axle brake circuit and a rear axle brake circuit. Preferably, the front axle brake circuit and the rear axle brake circuit are completely separate circuits. It may also be provided that left and right sides of the vehicle are combined in the individual brake circuits, so that, for example, the first compressed air supply is assigned to the left side of the vehicle and the second compressed air supply is assigned to the right side of the vehicle. These brake circuits can also be separate circuits.

In the event that the commercial vehicle has a second rear axle, an additional axle, a lift axle, or the like, this can, for example, be supplied by the rear axle modulator or supplied by its own axle modulator, in this case then a second rear axle modulator, an additional axle modulator or a lift axle modulator.

In an embodiment, it is provided that in the event that a fault is determined in the primary system which causes control of the front axle brake pressure or the rear axle brake pressure caused by the primary control unit to not be carried out or not to be carried out correctly, the control of the front axle brake pressure and/or the rear axle brake pressure is carried out redundantly by the secondary system. The secondary system therefore forms a redundant fallback level, which can preferably also be of electronic form. In addition, it may be provided that the electronically controllable pneumatic braking system has a second fallback level, which is of purely pneumatic form. For this purpose, a foot brake valve may be provided, which has a pneumatic output, by means of which a control pressure is then provided, which can be converted accordingly by the front and rear axle modulators into front and rear axle brake pressures.

Preferably, the trailer control valve is connected to the primary control unit by an electrical signal line and receives therefrom trailer brake signals and is configured to provide the trailer brake pressure at the trailer brake pressure port depending on the received trailer brake signals. The trailer control valve can preferably have a trailer redundancy port and is configured to redundantly control the trailer brake pressure depending on a trailer redundancy control pressure provided at the trailer redundancy port. The trailer redundancy control pressure can preferably be provided by the secondary control unit or a foot brake valve, or is a derived pressure derived from a pressure provided by the secondary control unit or the foot brake valve. Thus, while in the primary system the control of the trailer brake pressure is carried out electronically by the trailer control valve, in the secondary system only a purely pneumatic control of the trailer brake pressure, in this case the trailer redundancy brake pressure, takes place purely pneumatically, based on the received trailer redundancy control pressure. On the one hand, this can be controlled by the secondary control unit or can be derived from a pressure that is controlled by the secondary control unit. This pressure can also be a pressure provided directly by a foot brake valve or can be derived from this pressure. In a particularly simple variant, the front axle brake pressure controlled on the front axle is provided as the trailer redundancy control pressure at the trailer redundancy port. The front axle brake pressure is a derived pressure derived from a pressure caused by the secondary control unit. By providing electronic signals, the secondary control unit causes the front axle modulator to redundantly control the front axle brake pressure. It may also be provided that the secondary control unit directly controls a control pressure, which is then pneumatically and redundantly converted by the front axle modulator in order to redundantly control the front axle brake pressure. In this case, the pressure controlled by the secondary control unit for the front axle can also be transferred to the trailer control valve in order to control the trailer brake pressure redundantly.

In an embodiment, the trailer redundancy port of the trailer control valve is preceded by a trailer ABS valve, which is connected to the secondary control unit by a trailer ABS signal line and receives trailer ABS signals therefrom. In the event that the secondary control unit has to take over the control of the braking system because the primary control unit has partially or completely failed, the trailer brake pressure can preferably be pneumatically controlled as described above based on the trailer redundancy control pressure. In this case, an ABS system is typically no longer available in the trailer, as no corresponding signals can be received from the primary control unit, evaluated, and converted. In order to be able to bring about an improvement in the stability of the trailer, the trailer ABS valve can preferably be connected upstream of the trailer redundancy port in order to subject the trailer redundancy control pressure to ABS modulation and to provide an ABS-modulated or reliably modulated trailer redundancy control pressure at the trailer redundancy port. The trailer control valve then implements this already ABS-modulated trailer redundancy control pressure and controls the trailer brake pressure at the trailer brake pressure port in a corresponding redundant and ABS-controlled manner. It is also conceivable that the secondary system only partially takes over the control of the braking system, namely preferably only the control of the trailer control valve, in the event that an ABS system in the trailer has failed. In this case, both the front axle and the rear axle of the towing vehicle would continue to be controlled by the primary control unit, while the trailer control valve would be controlled by the secondary control unit.

In an embodiment, it is provided that the secondary control unit has a rear axle redundancy control port, at which it controls a rear axle redundancy control pressure depending on received brake request signals. It can also preferably have a front axle redundancy control port, at which it controls a front axle redundancy control pressure depending on received brake request signals. In this way, the secondary control unit can control a front axle redundancy control pressure and a rear axle redundancy control pressure, which can then be used for redundant and pneumatic control of the front and rear axles. In the event that a second rear axle is provided, this can also be controlled with the rear axle redundancy control pressure. The rear axle modulator in this case can preferably include a rear axle redundancy port for receiving the rear axle redundancy control pressure and is configured to redundantly control the rear axle brake pressure based on the received rear axle redundancy control pressure. In a consistent manner, the front axle modulator can preferably have a front axle redundancy port for receiving the front axle redundancy control pressure and is configured to redundantly control the front axle brake pressure based on the received front axle redundancy control pressure. For example, the front axle redundancy control pressure controlled at the front axle modulator can act on a control surface of a relay valve in the front axle modulator, so that the front axle modulator consequently controls the front axle redundancy control pressure controlled at the front axle modulator in a volume-boosted manner as the redundantly controlled front axle brake pressure.

It can also be preferred that the primary control unit and the secondary control unit have a vehicle bus port via which they are connected to a unit for autonomous driving and/or an active electronic steering device. The autonomous driving unit can specify trajectories, which are then converted by the primary control unit or the secondary control unit into brake request signals, or directly into brake signals, switching signals or the like to control other elements of the braking system. An active electronic steering device may also provide trajectories and/or steering signals, where appropriate. The braking system can also implement such signals, in particular to implement a steer-by-brake function. This may be necessary or preferred in critical driving situations or in redundancy or fail-operational cases.

In a third aspect, the aforementioned object is achieved by a commercial vehicle with an electronically controllable pneumatic braking system according to one of the embodiments of an electronically controllable pneumatic braking system described above according to the second aspect of the disclosure, which can preferably be configured to carry out the method according to one of the embodiments of the method described above according to the first aspect of the disclosure. The commercial vehicle includes an autonomous driving unit and/or an active electronic steering device.

BRIEF DESCRIPTION OF THE DRAWINGS

The invention will now be described with reference to the drawings wherein.

DESCRIPTION OF THE PREFERRED EMBODIMENTS

Figure 1:
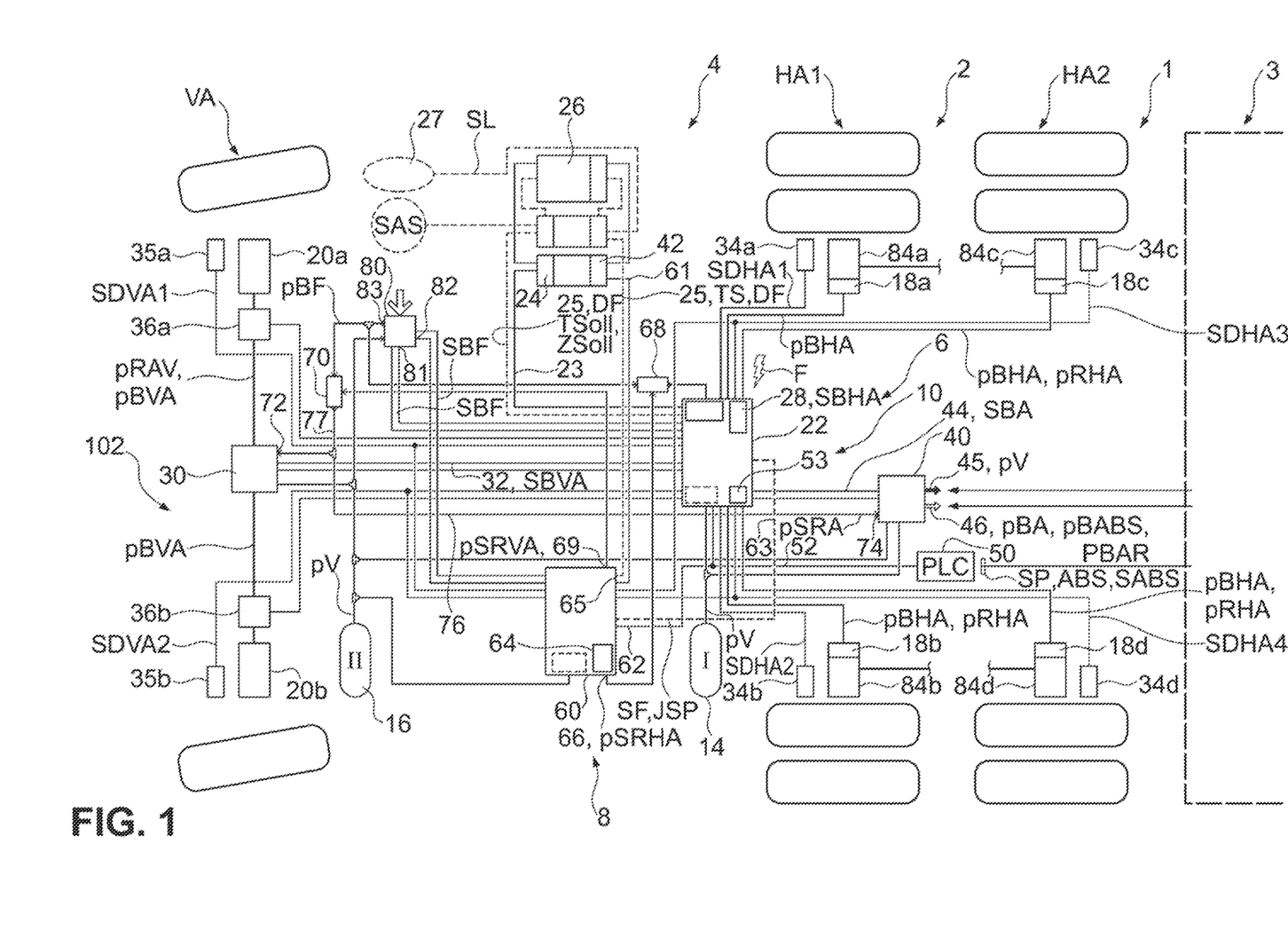
FIG. 1 shows a schematic representation of a commercial vehicle with an electronically controllable pneumatic braking system in a first embodiment; and, FIG. 2 shows a schematic representation of a commercial vehicle with an electronically controllable pneumatic braking system in a second embodiment.

A vehicle combination 1, which includes a towing vehicle 2 and a trailer 3, has an electronically controllable pneumatic braking system 4, which is provided in the towing vehicle 2. The towing vehicle 2 has a front axle VA, a first rear axle HA1 and a second rear axle HA2, which are collectively referred to as the rear axle HA, as they are controlled in the same way. The electronically controllable pneumatic braking system 4 includes a primary system 6 and a secondary system 8, which intervenes when a fault is detected in the primary system 6. A fault in the primary system 6 is in particular a fault that partially or completely prevents the control of a front axle brake pressure pBVA on the front axle VA and/or the control of a rear axle brake pressure pBHA on the rear axle HA. In this respect, the secondary system 8 intervenes in the event of redundancy and this can be described as a so-called fail-operational braking case.

The electronically controllable pneumatic braking system 4 also includes a rear axle brake circuit 10 and a front axle brake circuit 12. The rear axle brake circuit 10 is supplied by a first compressed air supply 14, while the front axle brake circuit 12 is supplied by a second compressed air supply 16. Both the first and the second compressed air supplies 14, 16 provide a supply pressure pV and are both supplied by an air treatment unit which is not shown here. Such an air treatment unit typically includes a multi-circuit protection valve as well as an air dryer. Although it is shown here that the electronically controllable pneumatic braking system 4 includes a rear axle brake circuit 10 and a front axle brake circuit 12, which are preferably separate circuits, a different division may also be provided, such as in particular a side-by-side division in the towing vehicle 2.

First and second rear axle brake actuators 18a, 18b are provided on the first rear axle HA1, and corresponding third and fourth rear axle brake actuators 18c, 18d are provided on the second rear axle HA2. If only one rear axle, for example the rear axle HA1, is provided, only first and second brake actuators 18a, 18b are provided on the rear axle HA. Likewise, the front axle VA is equipped with first and second front axle brake actuators 20a, 20b. Both the primary system 6 and the secondary system 8 use the first and second compressed air reservoirs 14, 16 and control the first and second and preferably third and fourth rear axle brake actuators 18a-18d and the first and second front axle brake actuators 20a, 20b, both by the primary system 6 in normal mode and in the case of redundancy by the secondary system 8.

To control the primary system 6, the electronically controllable pneumatic braking system 4 includes a primary control unit 22. The primary control unit 22 undertakes the task of a central control unit, as is basically known in electronically controllable pneumatic braking systems. The primary control unit 22 is supplied via a first power line 23 from a first voltage source 24. In addition, the primary control unit 22 is connected to a vehicle bus 25, via which it can receive data from a unit for autonomous driving 26, such as a target trajectory TSoll, a target deceleration ZSoll or other data, such as in particular vehicle data DF. The primary control unit 22 can then implement these data, as described in detail later. The primary control unit 22 also receives signals from an active electronic steering device 27 via the vehicle bus 25, such as in particular steering signals SL. These can also be implemented by the primary control unit 22.

Specifically, the primary control unit 22 controls a rear axle modulator 28, which is integrated into a module in the embodiment shown here together with the primary control unit 22. The primary control unit 22 also controls a front axle modulator 30. For this purpose, the primary control unit 22 is connected to the front axle modulator 30 via a first brake signal line 32. Both the rear axle modulator 28 and the front axle modulator 30 include one or more electromagnetically switchable valves and one or more relay valves or proportional valves. The rear axle modulator 28 or specifically the primary control unit 22 receives supply pressure pV from the first compressed air supply 14 and the front axle modulator 30 receives supply pressure pV from the second compressed air supply 16. Such a configuration is basically known and the exact configuration of front axle and rear axle modulators 30, 28 is also known. Typically, they included, for example, an electropneumatic input control unit with an inlet and outlet valve or a combined inlet/outlet valve and a relay valve. Via the first brake signal line 32, the primary control unit 22 provides front axle brake signals SBVA to the front axle modulator 30. On the one hand, these front axle brake signals SBVA can directly switch electropneumatic valves in the front axle modulator 30, which may then only have power amplifiers for this purpose. However, the front axle brake signals SBVA can also first be converted by intelligence in the form of an electronic control unit provided in the front axle modulator 30 and then provided to electromagnetic valves provided therein. Based on the reception of the front axle brake signals SBVA, the front axle brake pressure pBVA is then controlled by the front axle modulator 30. In a consistent manner, electromagnetic valves of the rear axle modulator 28 are switched by internal signals in the primary control unit 22 in order to control the rear axle brake pressure pBHA. Although four connections for the four rear axle brake actuators 18a-18d are shown in the embodiment shown, it should be understood that the rear axle modulator 28 can still be in single-channel or two-channel form. In the embodiment shown here, the rear axle modulator 28 has a two-channel configuration and controls the rear axle brake pressure pBHA side-appropriately and is thus already ABS-modulated. For this purpose, first to fourth rear axle revolution rate sensors 34a-34d are also provided on the first and second rear axle axles HA1, HA2, which sensors provide the first to fourth rear axle wheel revolution rate signals SDHA1-SDHA4 to the primary control unit 22. Also on the front axle VA, first and second front axle revolution rate sensors 35a, 35b are provided, which provide first and second front axle wheel revolution rate signals SDVA1, SDVA2 to the primary control unit 22. First and second ABS valves 36a, 36b are also provided on the front axle VA, which valves are connected to and switched by the primary control unit 22. In this respect, the front axle modulator 30 is configured here as a single-channel modulator and side-appropriate control of the front axle brake pressure pBVA is realized by the first and second ABS valves 36a, 36b. The corresponding switching signals for the first and second ABS valves 36a, 36b are provided by the primary control unit 22 during normal operation. In this way, the towing vehicle 2 can be operated completely autonomously during normal operation.

A trailer control valve 40 is provided for controlling the trailer 3. The trailer control valve 40 is supplied with electrical energy by the primary control unit 22. In other embodiments not shown here, the trailer control valve 40 can also be connected directly to the first voltage source or a second voltage source 42. The trailer control valve 40 receives trailer brake signals SBA from the primary control unit 22 via a second brake signal line 44, which can preferably be configured as a LIN-bus line. The trailer control valve 40 is connected here to both the first compressed air supply 14 and the second compressed air supply 16 and provides supply pressure pV via a trailer supply pressure port 45 and trailer brake pressure pBA via a trailer brake pressure port 46 depending on the trailer brake signal SBA controlled by the primary control unit 22. The trailer control valve 40 is coupled to the trailer 3 via the trailer supply pressure port 45 and the trailer brake pressure port 46. In addition, the electronically controllable pneumatic braking system includes a PLC connection (Power-Line Connection connection) 50, via which electrical energy and PLC signals SP can be provided to the trailer 3 and received from it. The PLC connection 50 is also connected to the primary control unit 22 via a first PLC line 52 and provides the received PLC signals SP to this. The primary control unit 22 has a PLC chip 53 for evaluating the PLC signals SP.

Such PLC signals SP include in particular information about the availability of an ABS system in the trailer 3 (not shown here) and may include further trailer-relevant information and data, such as in particular signals SPABS which represent the trailer ABS status SABS. Depending on these PLC signals SP, the primary control unit 22 can also adjust and vary the trailer brake signal SBA to cause braking of the trailer 3 based on the PLC signals SP.

The secondary system 8 includes a secondary control unit 60. The secondary control unit 60 is connected via a second power line 61 to one or the second voltage source 42, which is independent of the first voltage source 24. In this way, it can be ensured that in the event that the first voltage source 24 fails, and thus the primary control unit 22 fails, the secondary control unit 60 is still operational. The secondary control unit 60 has a vehicle bus port 65 and is also connected to the vehicle bus 25 via this and receives steering signals SL as well as target trajectories TSoll and target delays ZSoll and other vehicle data DF via the vehicle bus 25 from the unit for autonomous driving 26 and/or the active electronic steering device 27. In this embodiment, the secondary control unit 60 is also directly connected to the PLC connection 50 via a second PLC line 62. The first and second PLC lines 52, 62 are connected to the PLC connector 50 by Y-cabling, so that the PLC signals SP are provided directly at both the primary control unit 22 and the secondary control unit 60. The secondary control unit 60 is also connected to the primary control unit 22 via a bus connection 63, here a CAN-bus connection, so that the primary control unit 22 and the secondary control unit 60 can communicate with each other. Via this bus connection 63, a comparison of the PLC signals SP received at the primary control unit 22 and the secondary control unit 60 can also be carried out as well as a comparison of the processing of the PLC signals SP in the primary control unit 22 and the secondary control unit 60. In this embodiment, the secondary control unit 60 also includes a second PLC chip 64 to be able to process the PLC signals SP directly in the secondary control unit 60.

The secondary control unit 60 takes over the control of the braking system 4 in the event of a fault F. For example, a fault F can be indicated, for example, by an error signal SF of the primary control unit 22, or if the primary control unit 22 is deenergized, by a timeout signal TS which the secondary control unit 60 provides if it no longer receives signals or responses from the primary control unit 22 for a certain period of time.

The secondary control unit 60 is connected here to the second compressed air supply 16 but can also be alternatively or additionally connected to the first compressed air supply 14, or to a third compressed air supply which is not shown here. In the embodiment shown here, the secondary control unit 60 is not electrically or electronically connected to the front axle modulator 30 nor to the rear axle modulator 28. In addition, the secondary control unit 60 is not electronically connected to the trailer control valve 40. However, it could also be provided that such electronic lines are provided. In the embodiment shown here, the redundancy level, which is formed by the secondary system 8 and the secondary control unit 60, is of a purely pneumatic form.

In detail, the secondary control unit 60 has a rear axle redundancy control port 66, at which the secondary control unit 60 can control a rear axle redundancy control pressure pSRHA. It does this depending on the signals received via the vehicle bus. The rear axle redundancy control pressure pSRHA is then provided via a first changeover valve 68, which is configured as a select-high valve, to the primary control unit 22, which, depending on the received rear axle redundancy control pressure pSRHA, can redundantly control the rear axle brake pressure pBHA, which can then also be referred to as the rear axle redundancy brake pressure pRHA. This means that in the event that the secondary system 8 takes over the control, the rear axle brake pressure is controlled purely pneumatically by means of the primary control unit 22 or the rear axle modulator 28 integrated therein.

The secondary control unit 60 is also connected to the rear axle wheel revolution rate sensors 34a-34d via Y-cabling and can thus carry out slip control. The rear axle redundancy control pressure pSRHA can therefore preferably be provided slip-controlled by the secondary control unit 60.

In addition, the secondary control unit 60 has a front axle redundancy control port 69, at which the secondary control unit 60 can provide a front axle redundancy control pressure pSRVA. The front axle redundancy control pressure pSRVA is provided via a second changeover valve 70, which is configured as a select-high valve, to the front axle modulator 30, more precisely to a front axle redundancy port 72. There, the front axle redundancy control pressure pSRVA can, for example, act on a control surface of a relay valve, so that the front axle brake pressure pBVA can be redundantly controlled and can also be referred to as the front axle redundancy brake pressure pRVA. The ABS valves 36a, 36b on the front axle VA are also Y-cable connected to the secondary control unit 60, so that they can also be controlled in the event of redundancy, when the secondary control unit 60 takes over the control of the braking system 4. Likewise, the first and second front axle revolution rate sensors 35a, 35b are Y-cable connected to the secondary control unit 60. In the event of redundancy, slip-controlled control of the front axle brake pressure pBVA or the front axle redundancy brake pressure pRVA can also be carried out on the front axle.

In order to also be able to control the trailer control valve 40 in the event of redundancy, the trailer control valve 40 has a trailer redundancy port 74 and is configured to control the trailer brake pressure pBA or a redundant trailer brake pressure pBAR at the trailer brake pressure port 46 depending on a trailer redundancy control pressure pSRA provided at the trailer redundancy port 74. The trailer redundancy control pressure pSRA can also act on a control surface of a relay valve in the trailer control valve 40 in order to cause control of the trailer brake pressure pBA or the trailer redundancy brake pressure pBAR.

In the embodiment shown here, the trailer redundancy control pressure pSRA corresponds to the front axle redundancy control pressure pSRVA, since a trailer redundancy pressure line 76 branches from the front axle redundancy pressure line 77 downstream of the second changeover valve 70. However, it may also be provided in other embodiments that the secondary control unit 60 has its own connection for controlling the trailer redundancy control pressure pSRA in order to be able to control it in a trailer-appropriate manner. In the present embodiment, however, it is provided that the trailer 3 is controlled in accordance with the front axle VA.

Also shown in FIG. 1 is a foot brake valve 80, which has a first electrical output 81, a second electrical output 82 and a pneumatic output 83. The foot brake valve 80 is thus configured as a so-called 1P2E foot brake valve. The foot brake valve 80 provides an electric foot brake signal SBF at the first and second electrical outputs. The first electrical output 81 is connected here to the primary control unit 22, which accordingly receives the foot brake signal SBF. The second electrical output 82 of the foot brake valve 80 is connected to the secondary control unit 60, so that it also receives the foot brake signal SBF. The primary and secondary control units 22, 60 are configured to evaluate the foot brake signal SBF and, based on this, to control the front axle brake pressure pBVA, the rear axle brake pressure pBHA and the trailer brake pressure pBA in a corresponding manner or to request their control. This means that in the event that autonomous operation is not possible or not desired, and accordingly no brake requirement signals, target trajectories, or target decelerations are provided by the autonomous driving unit 26, the braking of the towing vehicle 2 can also be realized by means of the foot brake valve 80. A second redundancy level is also provided by means of the pneumatic output 83 of the foot brake valve 80. At the pneumatic output 83, the foot brake valve provides a pneumatic foot brake pressure pBF, which is provided in the embodiment shown here to both the first and the second changeover valves 68, 70. If this foot brake pressure pBF exceeds the rear axle redundancy control pressure pSRHA at the first changeover valve 68 or the front axle redundancy control pressure pSRVA at the second changeover valve 70, the corresponding foot brake pressure pBF is fed through and consequently provided at the primary control unit 22 or the rear axle modulator 28 and/or the front axle modulator 30 and in the embodiment shown here also via the trailer redundancy pressure line 76 to the trailer control valve 40. If the secondary control unit 60 also fails in addition to the primary control unit 22, purely pneumatic braking of the trailer 3 can still be applied and purely pneumatic braking of the trailer 3 can also be effected by means of the foot brake valve 80.

Not shown in FIG. 1 is a parking brake circuit, which is typically also provided in the towing vehicle 2. First to fourth parking brake actuators 84a-84d are also provided on the first and second rear axles HA1, HA2 for this purpose in addition to the first to fourth service brake actuators 18a-18d and are configured in particular as spring brake cylinders and are applied by means of a spring force. These parking brake actuators 84a-84d are applied when air is released and are released when air is supplied. A parking brake module which is not shown here is provided for applying air to and venting air from the parking brake actuators 84a-84d and can also be connected to the vehicle bus 25.

Figure 2:
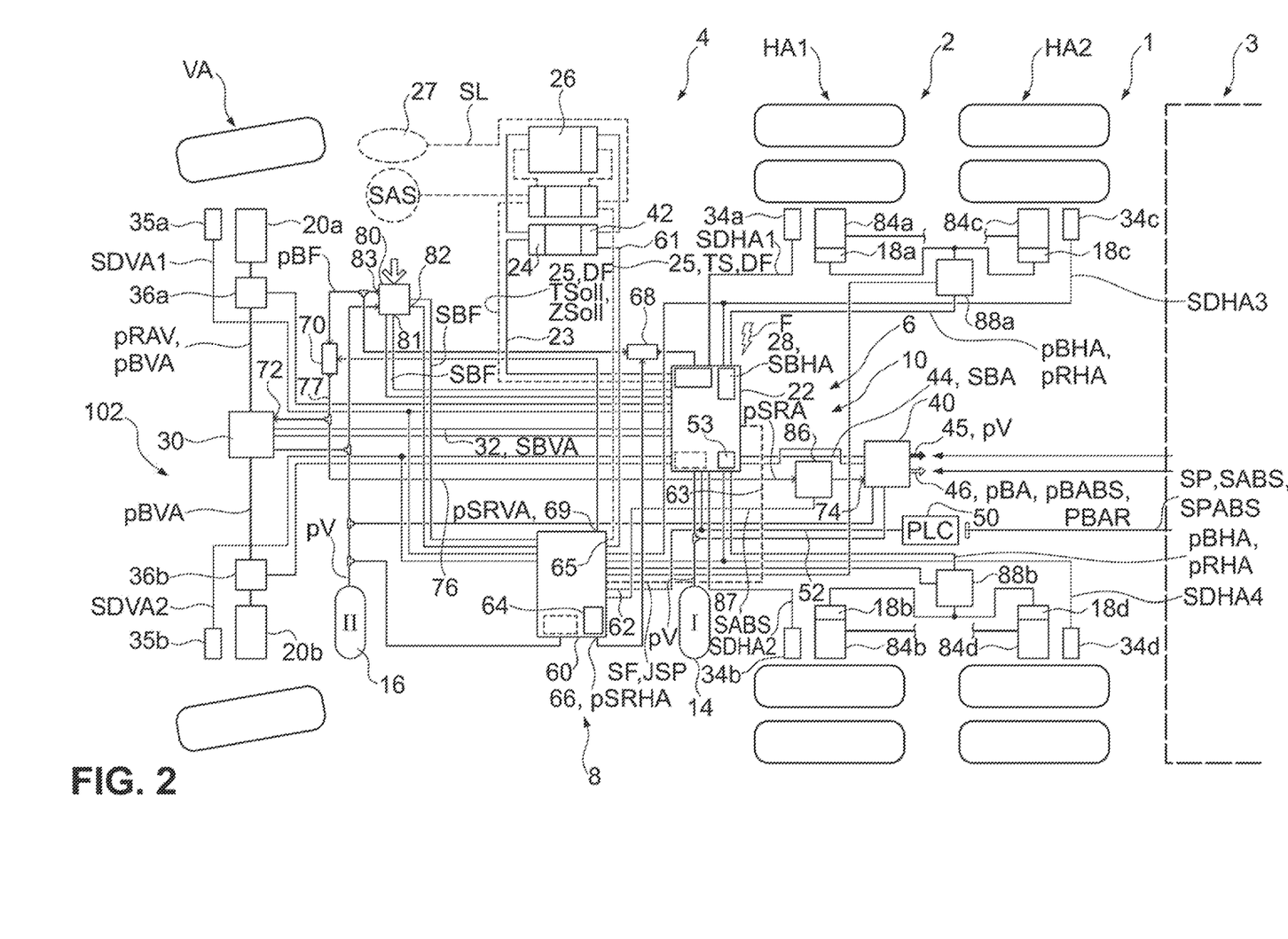

The embodiment shown in FIG. 2 is based on the embodiment shown in FIG. 1 and the same and similar elements are provided with the same reference characters. In this respect, full reference is made to the above description and in particular the differences from the first embodiment (FIG. 1) are described below.

A first significant difference in the second embodiment (FIG. 2) is that the trailer redundancy port 74 is preceded by a trailer ABS valve 86. The trailer ABS valve 86 is also used to enable control of the trailer 3 by means of the trailer redundancy control pressure pSRA, which is controlled by the secondary control unit 60 or whose control is caused by the secondary control unit 60, in the case of pneumatic control of the trailer 3. The trailer ABS valve 86 is connected to and controlled by the secondary control unit 60 via a trailer ABS line 87. The secondary control unit 60 can determine the availability of an ABS system in the trailer 3 from the PLC data SP. The secondary control unit 60 can preferably also be configured to read the availability of the trailer ABS system of the trailer 3 from the PLC data SP and in a corresponding manner to control the trailer ABS valve 86 by means of trailer ABS signals SABSS so that the trailer redundancy control pressure pSRA is provided in a pulsed form if necessary at the trailer control valve 40 to operate the service brake actuators in the trailer 3 in a pulsed manner.

Another difference in the second embodiment shown in FIG. 2 is that first and second rear axle ABS valves 88a, 88b are also provided on the first and second rear axles. These are used in particular to brake the rear axles HA1, HA2 under slip control in the redundancy mode, that is, when the secondary system 8 with the secondary control unit 60 takes over the control. During normal operation, the primary control unit 22 can preferably be configured to control the rear axle brake pressure pBHA in a side-appropriate and slip-controlled manner. In this respect, ABS valves and ABS power amplifiers can be integrated into the primary control unit 22. In the embodiment shown in FIG. 2, preferably no ABS valves are provided in the primary control unit 22. Rather, these are formed externally of the primary control unit 22 by the first and second rear axle ABS valves 88a, 88b, so that the rear axle ABS valves 88a, 88b can be controlled independently of both the primary control unit 22 and the secondary control unit 60. Thus, even in the redundancy mode, slip-controlled control of the rear axles HA1, HA2 by the secondary system 8 is possible.

It is understood that the foregoing description is that of the preferred embodiments of the invention and that various changes and modifications may be made thereto without departing from the spirit and scope of the invention as defined in the appended claims.

REFERENCE CHARACTER LIST (PART OF THE DESCRIPTION)

1 Vehicle combination
2 Towing vehicle
3 Trailer
4 Electronically controllable pneumatic braking system
6 Primary system
8 Secondary system 10 Rear axle braking circuit
12 Front axle braking circuit
14 First compressed air supply
16 Second compressed air supply
18a First rear axle brake actuator
18b Second rear axle brake actuator
18c Third rear axle brake actuator
18d Fourth rear axle brake actuator
20a First front axle brake actuator
20b Second front axle brake actuator
22 Primary control unit
23 First power line
24 First voltage source
25 Vehicle bus
26 Unit for autonomous driving
27 Active electronic steering device
28 Rear axle modulator
30 Front axle modulator
32 First brake signal line
34a First rear axle wheel revolution rate sensor
34b Second rear axle wheel revolution rate sensor
34c Third rear axle wheel revolution rate sensor
34d Fourth rear axle wheel revolution rate sensor
35a First front axle wheel revolution rate sensor
35b Second front axle wheel revolution rate sensor
36a First ABS valve
36b Second ABS valve
40 Trailer control valve
42 Second voltage source
44 Second brake signal line
45 Trailer supply pressure port
46 Trailer brake pressure port
50 PLC connection
52 First PLC line
53 First PLC chip
60 Secondary control unit
61 Second power line
62 Second PLC line
63 Bus connection
64 Second PLC chip
65 Vehicle bus port of the secondary control unit
66 Rear axle redundancy control port
68 First changeover valve
69 Front axle redundancy control port
70 Second changeover valve
72 Front axle redundancy port
74 Trailer redundancy port
76 Trailer redundancy pressure line
77 Front axle redundancy pressure line
80 Foot brake valve
81 First electrical output
82 Second electrical output
83 Pneumatic output
84a First parking brake actuator
84b Second parking brake actuator
84c Third parking brake actuator
84d Fourth parking brake actuator
86 Trailer ABS valve
87 Trailer ABS line
88a First rear axle ABS valve
88b Second rear axle ABS valve
DF Vehicle data
F Fault
HA1 First rear axle
HA2 Second rear axle
ISP Information about the processing of PLC signals
pBA Trailer brake pressure
pBF Foot brake pressure
pBHA Rear axle brake pressure
pBVA Front axle brake pressure
pRHA Rear axle redundancy brake pressure
pRVA Front axle redundancy brake pressure
pRHA Rear axle redundancy brake pressure
pSRA Trailer redundancy control pressure
pSRHA Rear axle redundancy control pressure
pSRVA Front axle redundancy control pressure
pV Supply pressure
SABS Trailer ABS Status
SABSS Trailer ABS Signals
SBA Trailer brake signals
SBHA Rear axle brake signals
SBVA Front axle brake signals
SDHA1 First rear axle wheel revolution rate signal
SDHA2 Second rear axle wheel revolution rate signal
SDHA3 Third rear axle wheel revolution rate signal
SDHA4 Fourth rear axle wheel revolution rate signal
SDVA1 First front axle wheel revolution rate signal
SDVA2 Second front axle wheel revolution rate signal
SF Error signal
SL Steering signals
SP PLC Signals
SPABS Signals indicating a trailer ABS status
TS Timeout signal
TSoll Target trajectory
VA Front axle
ZSoll Target deceleration

What is claimed is:

1. An electronically controllable pneumatic braking system for a towing vehicle of a vehicle combination, the electronically controllable pneumatic braking system comprising:
a first front axle brake actuator and a second front axle brake actuator on a front axle of the towing vehicle;
a first rear axle brake actuator and a second rear axle brake actuator on a rear axle of the towing vehicle;
a primary system having a primary control unit configured to control said first front axle brake actuator, said second front axle brake actuator, said first rear axle brake actuator, and said second rear axle brake actuator;
a secondary system having a secondary control unit configured to control said first front axle brake actuator, said second front axle brake actuator, said first rear axle brake actuator, and said second rear axle brake actuator in an event that a fault is detected in said primary system and the electronically controllable pneumatic braking system is controlled at least partially by said secondary system;
a trailer control valve configured to be controllable by said primary control unit to provide a trailer brake pressure at a trailer brake pressure port;
a PLC connection for receiving PLC signals from a trailer of the vehicle combination; and,
wherein both said primary system and said secondary system are configured to receive and process the PLC signals provided at said PLC connection.

2. The electronically controllable pneumatic braking system of claim 1, wherein said primary control unit and said secondary control unit are directly or indirectly connected to said PLC connection to receive the PLC signals from said PLC connection.

3. The electronically controllable pneumatic braking system of claim 2, wherein said primary control unit and said secondary control unit are connected to said PLC connection via a Y-cabling.

4. The electronically controllable pneumatic braking system of claim 2, wherein said primary control unit and said secondary control unit have a vehicle bus port via which said primary control unit and said secondary control unit are connected to at least one of a unit for autonomous driving and an active electronic steering device.

5. The electronically controllable pneumatic braking system of claim 1 further comprising:
a rear axle modulator connected to at least a first compressed air supply or a second compressed air supply, said rear axle modulator being configured to control at least a rear axle brake pressure at said first rear axle brake actuator and said second rear axle brake actuator in dependence upon rear axle brake signals provided by said primary control unit; and,
a front axle modulator connected to at least the first compressed air supply or the second compressed air supply, said front axle modulator being configured to control at least a front axle brake pressure at said first front axle brake actuator and said second front axle brake actuator in dependence upon at least one of front axle brake signals provided by said primary control unit and a pneumatic front axle control pressure.

6. The electronically controllable pneumatic braking system of claim 5, wherein in the event that a fault is detected in said primary system which causes that an adjustment by said primary control unit of the front axle brake pressure or the rear axle brake pressure cannot be carried out or cannot be carried out correctly, said secondary system is configured to redundantly control at least one of the front axle brake pressure and the rear axle brake pressure.

7. The electronically controllable pneumatic braking system of claim 6, wherein:
said secondary control unit has a rear axle redundancy control port at which said secondary control unit is configured to control a rear axle redundancy control pressure in dependence upon received brake request signals;
said secondary control unit further has a front axle redundancy control port at which said secondary control unit is configured to control a front axle redundancy control pressure in dependence upon received brake request signals;
said rear axle modulator has a rear axle redundancy port for receiving the rear axle redundancy control pressure and is configured to redundantly control the rear axle brake pressure based on the received rear axle redundancy control pressure; and,
said front axle modulator has a front axle redundancy port for receiving the front axle redundancy control pressure and is configured to redundantly control the front axle brake pressure based on the received front axle redundancy control pressure.

8. The electronically controllable pneumatic braking system of claim 6, wherein:
said trailer control valve is connected to said primary control unit via an electrical signal line and is configured to receive trailer brake signals from said electrical signal line;
said trailer control valve is further configured to provide the trailer brake pressure at the trailer brake pressure port in dependence upon the received trailer brake signals;
said trailer control valve has a trailer redundancy port and is configured to redundantly control the trailer brake pressure in dependence upon a trailer redundancy control pressure provided at the trailer redundancy port; and,
wherein the trailer redundancy control pressure is provided by said secondary control unit or a foot brake valve, or is a pressure derived from the pressure provided by said secondary control unit or provided by the foot brake valve.

9. The electronically controllable pneumatic braking system of claim 8, wherein said trailer redundancy port of the trailer control valve is preceded by a trailer ABS valve connected by a trailer ABS signal line to said secondary control unit and is configured to receive trailer ABS signals therefrom.

10. The electronically controllable pneumatic braking system of claim 1, wherein said primary control unit has a primary PLC chip configured to process the PLC signals and said secondary control unit has a secondary PLC chip configured to process the PLC signals.

11. The electronically controllable pneumatic braking system of claim 1, wherein said primary control unit and said secondary control unit are connected to each other via a data bus for exchanging information about processing of the PLC signals.

12. A method for controlling an electronically controllable pneumatic braking system for a towing vehicle of a vehicle combination, wherein the electronically controllable pneumatic braking system includes a first front axle brake actuator and a second front axle brake actuator on a front axle of the towing vehicle and a first rear axle brake actuator and a second rear axle brake actuator on a rear axle of the towing vehicle; the electronically controllable pneumatic braking system further including a primary system and a secondary system, the primary system having a primary control unit at least for controlling the first front axle brake actuator, the second front axle brake actuator, the first rear axle brake actuator, and the second rear axle brake actuator, the secondary system having a secondary control unit at least for controlling the first front axle brake actuator, the second front axle brake actuator, the first rear axle brake actuator, and the second rear axle brake actuator in an event that a fault is detected in the primary system and the electronically controllable pneumatic braking system is controlled at least partially by the secondary system; the electronically controllable pneumatic braking system further including a trailer control valve and a PLC connection, the trailer control valve being configured to be controlled by the primary control unit to provide a trailer brake pressure at a trailer brake pressure port; and wherein the PLC connection is configured to receive PLC signals from a trailer of the vehicle combination; the method comprising:
providing PLC signals received at the PLC connection in both the primary system and the secondary system; and,
processing PLC signals in both the primary system and the secondary system.

13. The method of claim 12, wherein the PLC signals include signals representing a trailer ABS status.

14. The method of claim 1, wherein in an event that an ABS function in the trailer is not available, a reliable modulation of the trailer brake pressure is carried out in at least one of the primary system and the secondary system and the reliably modulated trailer brake pressure is provided at the trailer brake pressure port.

15. The method of claim 12, wherein in an event that the primary system is in a fault-free condition, the trailer brake pressure is provided by the primary system at the trailer brake pressure port; and, in the event that a fault is detected in the primary system, the trailer brake pressure is provided at the trailer brake pressure port as a trailer redundancy brake pressure by the secondary system.

16. The method of claim 15, wherein the trailer brake pressure provided by the primary system is partially or completely independent of a front axle brake pressure and a rear axle brake pressure; and, the trailer redundancy brake pressure provided by the secondary system is the front axle brake pressure or the rear axle brake pressure or a pressure derived therefrom.

17. The method of claim 12, wherein said processing the PLC signals in both the primary system and in the secondary system includes:
processing the PLC signals in the primary control unit; and,
processing the PLC signals in the secondary control unit.

18. The method of claim 12, wherein in an event that the primary system is in a fault-free state, the method further comprises:
comparing PLC signals received in the primary system and secondary system.

19. The method of claim 12 further comprising providing the trailer brake pressure at the trailer brake pressure port by at least one of the primary system and the secondary system depending on the received PLC signals.

20. The method of claim 12, wherein said processing the PLC signals, both in the primary system and in the secondary system, includes:
receiving vehicle data via a vehicle bus at the primary system and the secondary system; and,
combining the received PLC signals with the received vehicle data.

21. A commercial vehicle comprising:
an electronically controllable pneumatic braking system having a first front axle brake actuator and a second front axle brake actuator on a front axle of the vehicle;
said electronically controllable pneumatic braking system further having a first rear axle brake actuator and a second rear axle brake actuator on a rear axle of the vehicle;
said electronically controllable pneumatic braking system including a primary system, a secondary system, a trailer control valve, and a PLC connection;
said primary system having a primary control unit configured to control said first front axle brake actuator, said second front axle brake actuator, said first rear axle brake actuator, and said second rear axle brake actuator;
said secondary system having a secondary control unit configured to control said first front axle brake actuator, said second front axle brake actuator, said first rear axle brake actuator, and said second rear axle brake actuator in an event that a fault is detected in said primary system and the electronically controllable pneumatic braking system is controlled at least partially by said secondary system;
said trailer control valve being configured to be controllable by said primary control unit to provide a trailer brake pressure at a trailer brake pressure port;
said PLC connection being configured to receive PLC signals from a trailer;
wherein both said primary system and said secondary system are configured to receive and process PLC signals provided at said PLC connection;
at least one of a unit for autonomous driving and an active electronic steering device; and,
wherein said electronically controllable pneumatic braking system is configured to provide PLC signals received at said PLC connection in both said primary system and said secondary system, and, to process the PLC signals in both said primary system and said secondary system.

* * * * *